Figure 4:
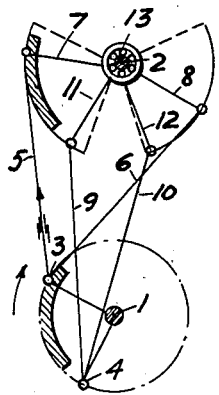

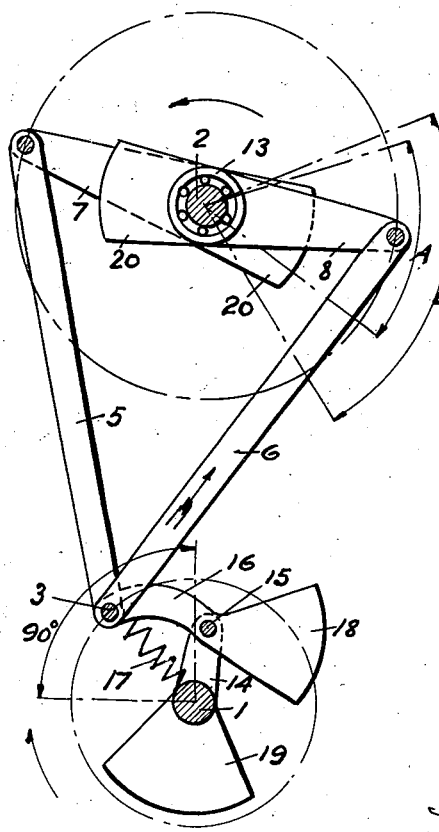
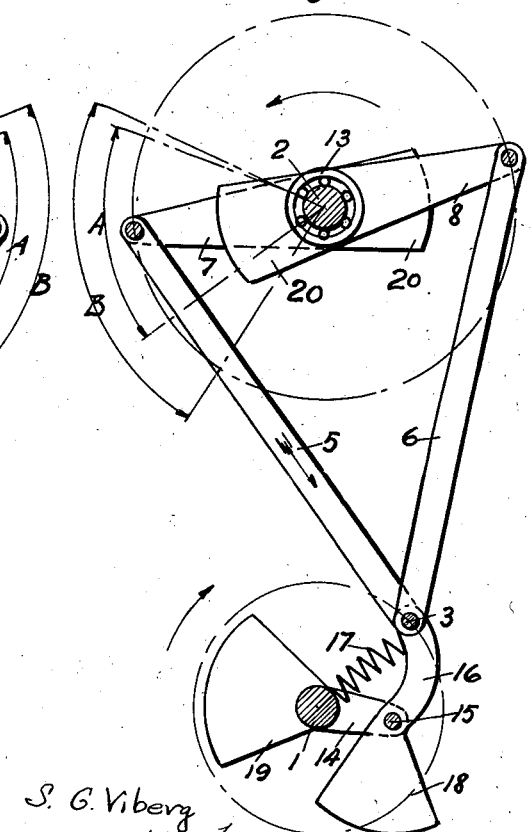

Nov. 24, 1936.  S. G. VIBERG  2,062,241

CONTINUOUSLY VARIABLE CHANGE SPEED MECHANISM

Filed Oct. 30, 1935  11 Sheets-Sheet 2

S. G. Viberg
INVENTOR

By: Glascock Downing Seefeld
ATTYS.

Nov. 24, 1936. S. G. VIBERG 2,062,241
CONTINUOUSLY VARIABLE CHANGE SPEED MECHANISM
Filed Oct. 30, 1935 11 Sheets-Sheet 3
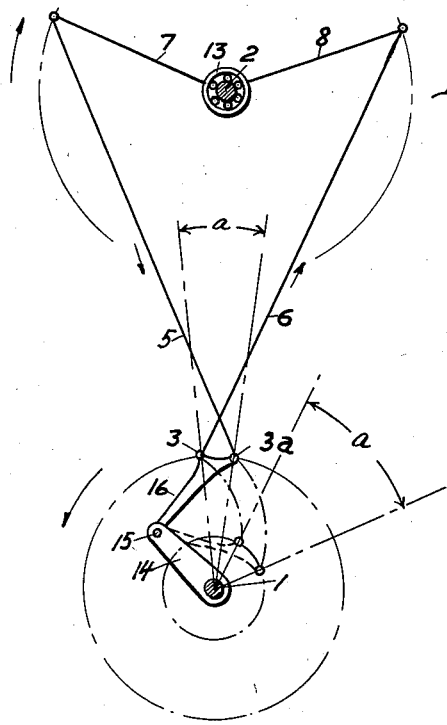
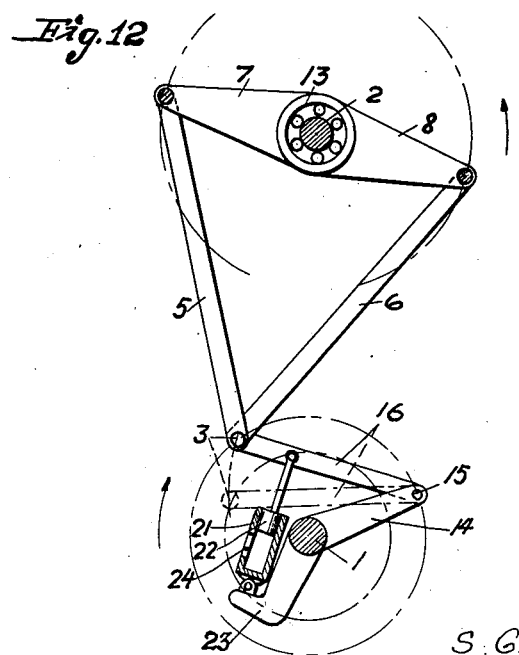
S. G. Viberg
INVENTOR
By: Glascock Downing Seebold
Attys.

Nov. 24, 1936.    S. G. VIBERG    2,062,241
CONTINUOUSLY VARIABLE CHANGE SPEED MECHANISM
Filed Oct. 30, 1935    11 Sheets-Sheet 4

S. G. Viberg, Inventor
By Glascock Downing & Seebold
Attys.

Nov. 24, 1936.  S. G. VIBERG  2,062,241

CONTINUOUSLY VARIABLE CHANGE SPEED MECHANISM

Filed Oct. 30, 1935  11 Sheets-Sheet 5

S. G. Viberg
INVENTOR

By: Glascock Downing Seebold
Attys.

Nov. 24, 1936.   S. G. VIBERG   2,062,241
CONTINUOUSLY VARIABLE CHANGE SPEED MECHANISM
Filed Oct. 30, 1935   11 Sheets-Sheet 7

Nov. 24, 1936.  S. G. VIBERG  2,062,241
CONTINUOUSLY VARIABLE CHANGE SPEED MECHANISM
Filed Oct. 30, 1935  11 Sheets-Sheet 8
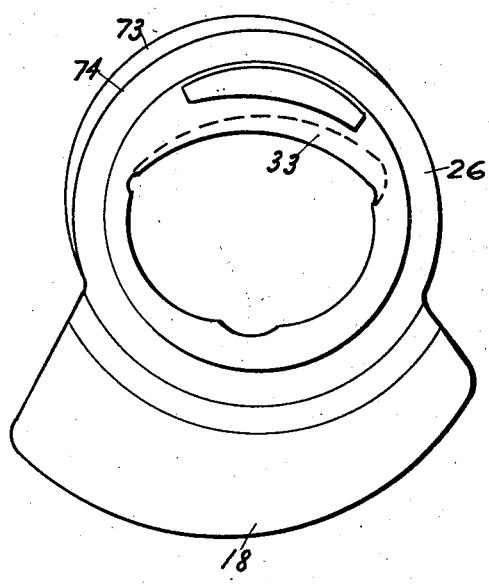
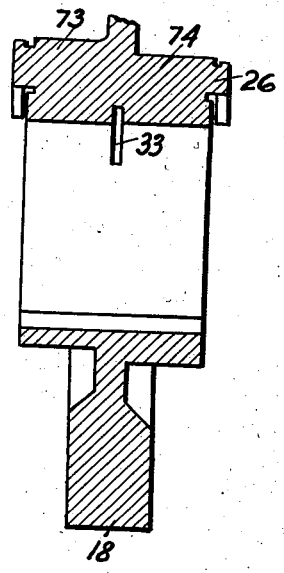
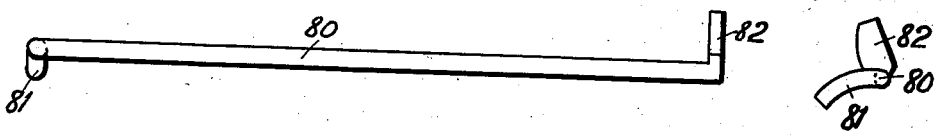
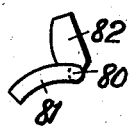
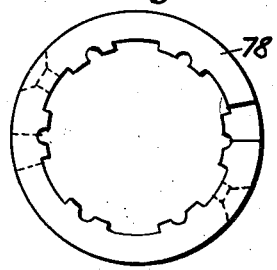
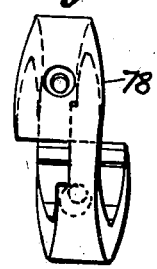
S. G. Viberg
INVENTOR Nov. 24, 1936.  S. G. VIBERG  2,062,241
CONTINUOUSLY VARIABLE CHANGE SPEED MECHANISM
Filed Oct. 30, 1935  11 Sheets-Sheet 9
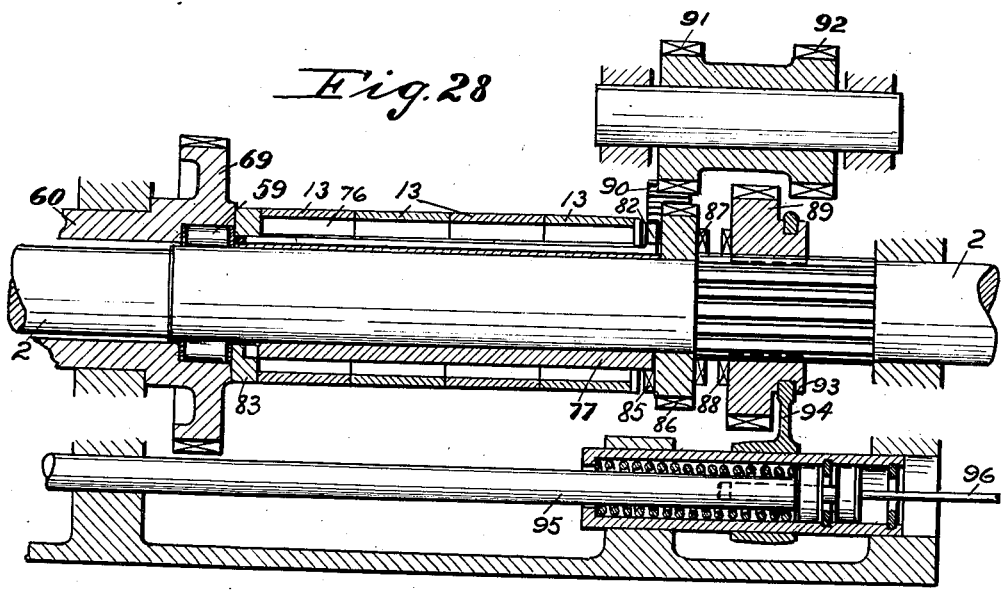
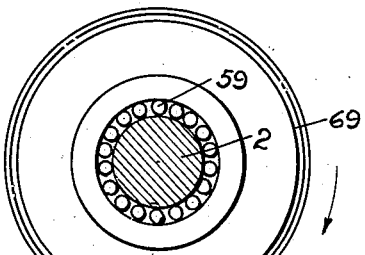
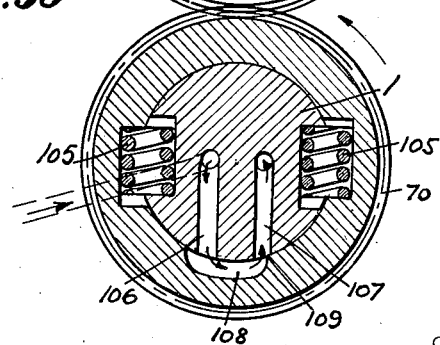
S. G. Viberg
INVENTOR
By: Glascock Downing & Seebold
Attys.

Nov. 24, 1936.                S. G. VIBERG                2,062,241
            CONTINUOUSLY VARIABLE CHANGE SPEED MECHANISM
                    Filed Oct. 30, 1935        11 Sheets-Sheet 10
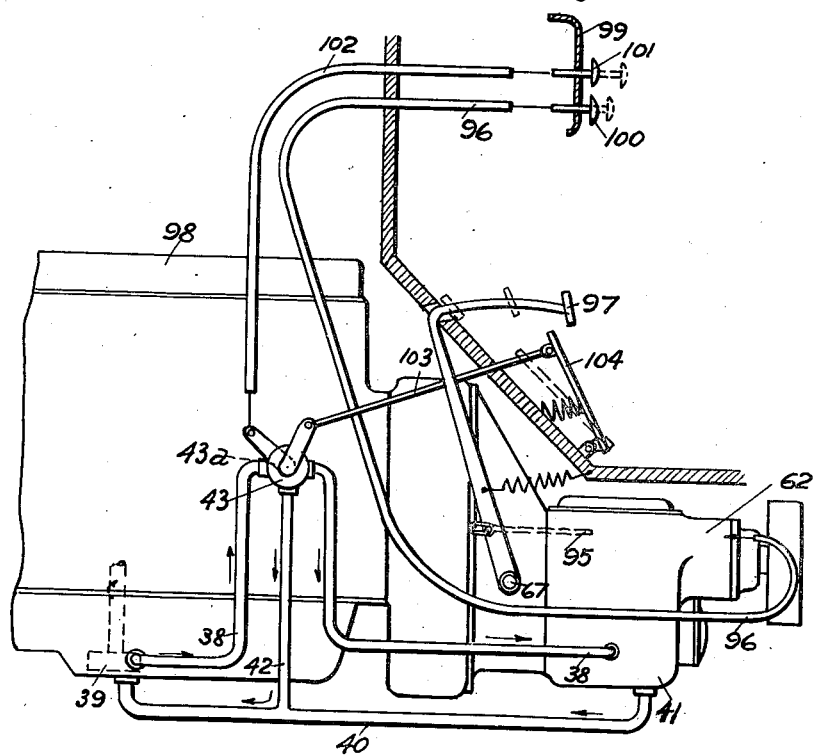

Nov. 24, 1936.    S. G. VIBERG    2,062,241
CONTINUOUSLY VARIABLE CHANGE SPEED MECHANISM
Filed Oct. 30, 1935    11 Sheets-Sheet 11

S. G. Viberg
INVENTOR
By Glascock Downing Seibold
Attys.

Patented Nov. 24, 1936

2,062,241

UNITED STATES PATENT OFFICE 2,062,241

CONTINUOUSLY VARIABLE CHANGE SPEED MECHANISM

Sven Gösta Viberg, Gothenburg, Sweden, assignor to Nestor Hammarstrom and Gustaf Augustinus Sundberg, both of Gothenburg, Sweden Application October 30, 1935, Serial No. 47,484
In Sweden October 31, 1934

17 Claims. (Cl. 74—117)

The invention is for improvements in and relating to continuously variable change speed mechanism between a driving and a driven shaft of the type in which the means transmitting power from one shaft to the other comprises reciprocating driving members the movements of which through the medium of one-way acting devices or clutches are converted into a rotary movement applied to the driven shaft and in which the change of the speed ratio is effected by variation of the length of stroke of the reciprocating driving members.

The invention relates in particular to a change speed mechanism of the said type for motor vehicles and has for its object to provide a mechanism of this kind which is simple in construction and compact and which can easily be substituted for the ordinary gear box without necessitating constructional alterations of the vehicle. A further object of the invention is to provide simple and reliable means whereby either a completely automatic or a completely manual change of the speed ratio can be had and to cause this ratio to vary not only with the load on the driven shaft (the road resistance) but also with the torque of the driving motor, so that a continuously variable ratio is obtained between the ingoing and outgoing torque and, neglecting friction losses and the like, the secondary effect is equal to or substantially equal to the primary effect, independent of how the latter varies.

The invention is essentially characterized in that the driving means for effecting the reciprocating movements (for example crank pins, eccentrics, swash plates or the like) comprises a hydraulically resilient device in which the pressure varies responsive to the torque of the driven shaft (the load) in such manner that the length of stroke of the reciprocating driving members tends to decrease when the said torque increases and vice versa. The amount of liquid supplied, i. e. the pressure in the said hydraulic device, may further vary responsive also to the torque of the driving shaft in such manner that the length of stroke of said driving members tends to increase when the said torque increases and vice versa. In order that it should be possible to vary the length of stroke of the reciprocating driving members, i. e. the speed ratio, independent of the magnitude of the said torque, a manually or automatically operable valve member is preferably provided in a pressure conduit of the hydraulic device, by means of which the amount of pressure liquid supplied to the said device be varied at any time.

Figure 5:
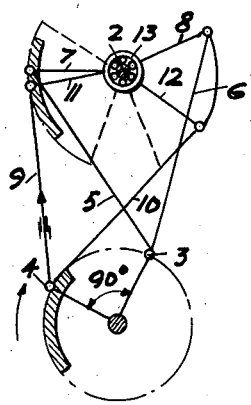
Figure 6:
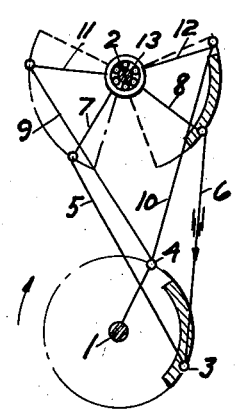
Figure 16:
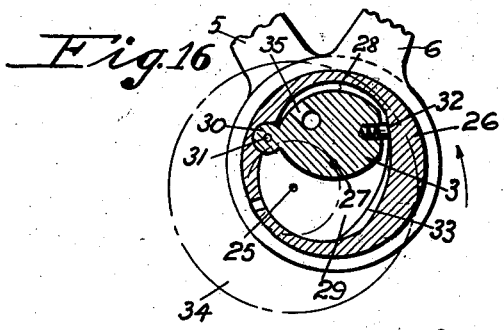
Figure 17:
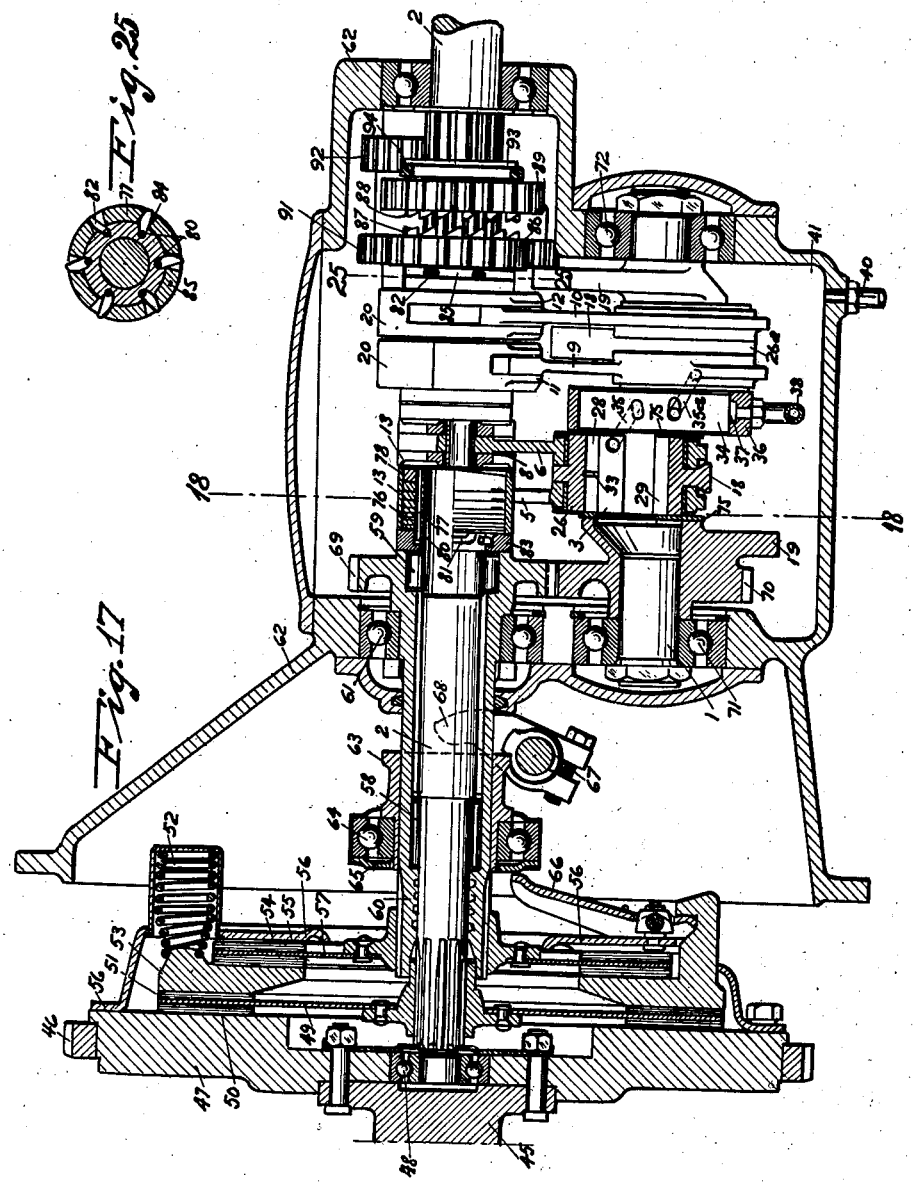
Figure 18:
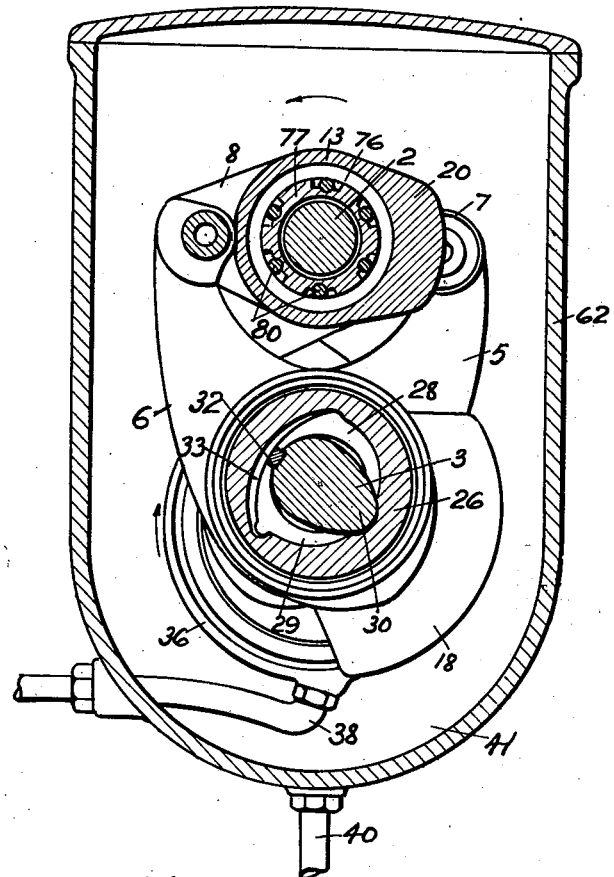
Figure 21:
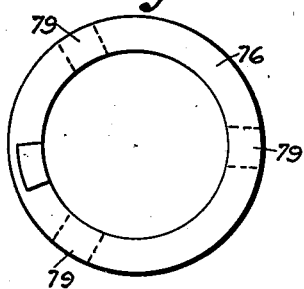
Figure 22:
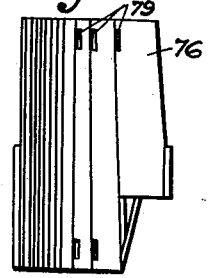
Figure 31:
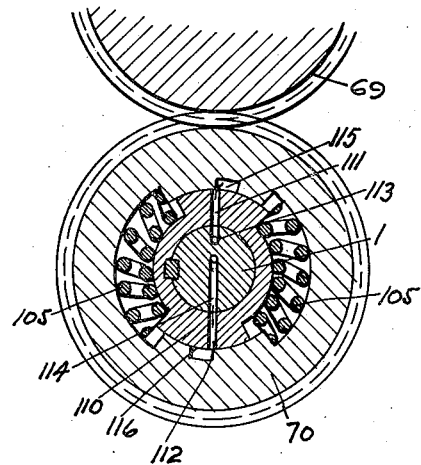
Figure 32:
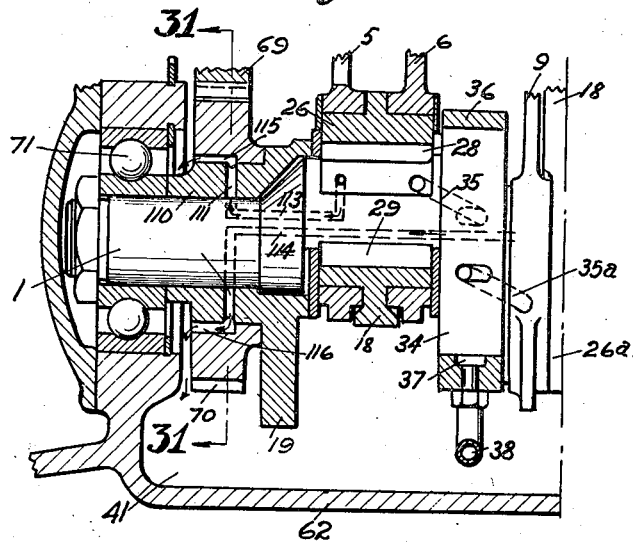

In the accompanying drawings are shown, partly schematically, some embodiments of a mechanism according to the invention. Figs. 1–3 illustrate schematically the principle of a one-way clutch mechanism of a type which has been used for a change speed mechanism according to the invention, the shafts rotating in opposite directions. Figs. 4–6 show a similar mechanism in which the shafts rotate in the same direction. Figs. 7–10 show schematically an embodiment according to Figs. 1–3 in which the crank radius of the reciprocating driving members is variable. Fig. 11 shows schematically an embodiment of the application of an eccentric mechanism to a change speed mechanism according to the invention. Fig. 12 shows schematically an embodiment of a one-way clutch according to the invention in which the length of stroke of the driving members is hydraulically controlled. Figs. 13–16 show, partly schematically, the hydraulic mechanism applied to an eccentric according to the invention with the eccentric in different positions. Fig. 17 is an axial section of a constructive embodiment of a change speed mechanism according to the invention conformably to the principle shown in Figs. 1–3 and provided with an eccentric mechanism according to Figs. 13–16. Fig. 18 shows a cross section of the mechanism on the line 18—18 in Fig. 17. Figs. 19 and 20 show an elevation and a section of the eccentric on a larger scale. Figs. 21 and 22 show two elevations at right angles of a spring forming part of a one-way clutch mechanism included in the change speed mechanism. Figs. 23 and 24 show similar views of a supporting ring for the spring of the one-way clutch. Fig. 25 shows a cross section on the line 25—25 in Fig. 17 of a torsion coupling forming part of the change speed mechanism. Figs. 26 and 27 show a side elevation and an end elevation of a bar forming part of the torsion coupling. Fig. 28 shows the details of a reverse gear forming part of the change speed mechanism. Fig. 29 shows schematically the arrangement of a change speed mechanism according to Figs. 17–28 as applied to an automobile motor. Fig. 30 shows a device for varying the amount of pressure liquid supplied, and thereby the length of stroke, responsive to the torque of the motor. Figs. 31 and 32 show a modified form of the invention.

In the schematic Figs. 1–6 the reference numeral 1 denotes the driving shaft, in the following referred to as the crank shaft, and 2 the driven shaft, in the following referred to as the clutch shaft. The crank shaft is provided with two crank pins 3 and 4 which according to Figs. 1-3 are displaced 180° relative to each other and according to Figs. 4-6, 90° relative to each other. To the crank pin 3 are connected the lower ends of two connecting rods 5 and 6, the upper ends of which are each connected to oscillator arms 7 and 8. Two connecting rods 9 and 10 are in the same way connected to the crank pin 4 and to oscillating arms 11 and 12 respectively. The oscillator arms are each fast upon the outer sleeve of independent one-way clutches 13 (only one of these is shown in the figures), all of which are adapted for clutch engagement when the rotation is in a counter-clockwise direction according to Figs. 1-3 and when the rotation is in a clockwise direction according to Figs. 4-6, as indicated by the arrows.

According to Figs. 1-3 the connecting rods 5 and 9 are in clutching engagement (as pulling) when moving from an upper to a lower end position and are disengaged during the other part of the revolution under the upward movement, whereas the connecting rods 6 and 10 are in clutching engagement (as pushing) when moving upwardly and are disengaged when moving downwardly. Through this alternating action of the connecting rods the clutch shaft 2 is made to revolve, through the medium of the one-way clutches 13, in a direction opposite to the direction of rotation of the crank shaft 1. Fig. 1 shows the connecting rod 5 in its upper dead centre, while the connecting rod 6 mounted on the same crank pin 3 is clutch loaded (pressure) and moves with a relatively great velocity toward its upper dead centre. Fig. 2 shows the connecting rod 6 in its upper dead centre. The clutch change-over to the connecting rod 5 has already taken place and this is now clutch loaded (as pulling). Fig. 3 shows the position of the crank pins and the connecting rods when the clutch change-over from the connecting rod 5 on the crank pin 3 to the connecting rod 10 on the crank pin 4 takes place. In this position the crank pin 3 has just completed its working stroke and the crank pin 4 starts its working stroke. In an arrangement according to Figs. 1-3 the crank shaft 1 and the clutch shaft 2 thus rotate in opposite directions and for each crank pin and for each turn of the crank shaft there is an active period extending over 180° and an inactive period extending over 180°, which latter period, as more fully described in the following, is utilized for filling liquid into the hydraulic device according to the invention.

The embodiment shown in Figs. 4-6 differs from that shown in Figs. 1-3 only in that the clutches 13 are so arranged that the crank shaft 1 and the clutch shaft 2 rotate in the same direction and that the crank pins 3 and 4 are displaced 90° relatively to each other, so that for each crank pin and for each turn of the crank shaft there are two active periods and two inactive periods of 90° each.

For clutching action the velocity of the oscillator (the external clutch sleeve 13) must be equal to or greater than that of the crank shaft. The momentary velocity of the clutch shaft is, provided that the shaft is elastically connected with the driven member, for example the propeller shaft of an automobile, equal to that of the driving oscillator. Owing to the crank movement the velocity of the latter is variable and when the clutch change-over takes place is decreasing. The oscillator which now is about to engage has an increasing velocity. Provided that there is no dead action in the clutch mechanism the clutch change-over takes place when the velocities of both oscillators are equal.

It follows that the clutch members always are connected with that oscillator, the velocity of which momentarily is the greatest. The relative positions of the crank pins should therefore be so arranged that the impulses of force transmitted by the connecting rods follow on each other evenly. In this way the velocity of the clutch shaft varies as little as possible. The velocity of the oscillator is, as already stated, variable and thus when there is clutching engagement the velocity of the clutch shaft is also variable. If now the moment of inertia of the clutch shaft is great or if it is rigidly connected with the propeller shaft of an automobile it tends to maintain a constant velocity. One-way clutch mechanisms of this type, i. e. having connecting rods, are however feasible only if there is a difference of velocity between the driving and the driven clutch members. It is thus, as will more fully be described in the following, necessary to provide an elastic medium or coupling at some point of the system. This elastic coupling should have such a constant of elasticity that, for example directly before the clutch change-over takes place, the clutch sleeve together with the clutch members carried thereon are made to participate in the retarding velocity of the oscillator.

In a device of the present kind it is assumed that the speed ratio of the crank shaft to the clutch shaft should be variable within certain limits. One way of accomplishing this is to make the crank radius variable.

An embodiment of this kind is shown schematically in Figs. 7-10. The device is principally of the same kind as shown in Figs. 1-3 in which the crank shaft and the clutch shaft rotate in opposite directions. For the sake of simplicity only one pair of connecting rods 5, 6 mounted on the crank pin 3 together with the corresponding oscillator arms 7 and 8 are shown, each of said arms, as described above, being fixed to separate outer sleeves 13 (the oscillators) of different one-way clutches.

Figure 9:
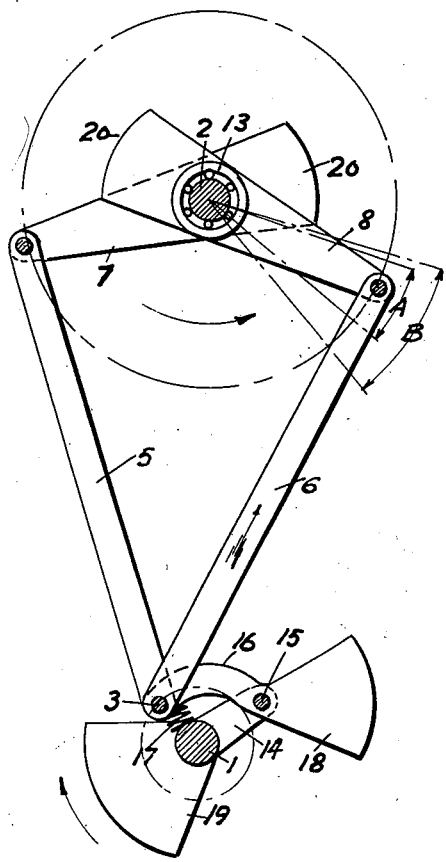
Figure 10:
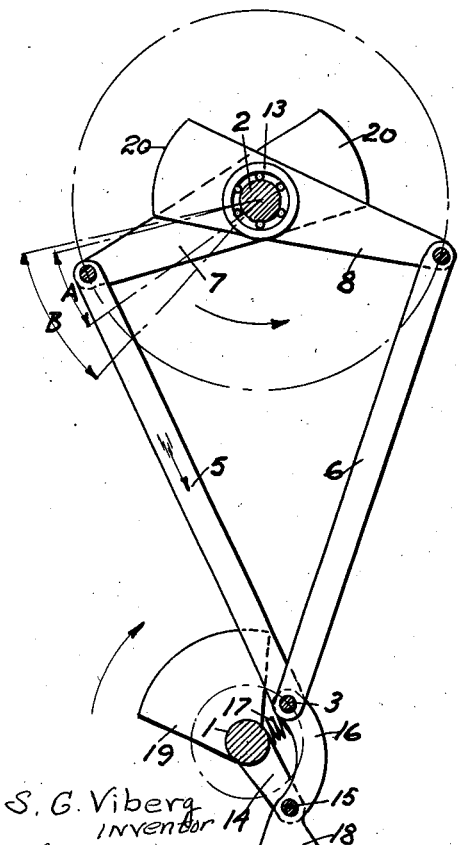

To the crank shaft 1 is secured an arm 14 at the free end of which is revolvably mounted on a pivot 15 an eccentric arm 16 carrying the crank pin 3 with which the lower ends of the connecting rods 5 and 6 are connected. Between the free end of the eccentric arm 16 and the crank shaft 1 is interposed a spring 17 which is compressed by the uni-directed moment acting on the eccentric arm 16 during the active period of the crank pin 3, whereby the crank radius is decreased, as shown in Figs. 9 and 10. In a device of this kind the eccentric moment arising during the active period of the crank pin is independent as regards its direction of whether the connecting rod 5 or 6 is in action, and provided that the crank shaft moment is constant the eccentric moment increases when the speed ratio is reduced, i. e. when crank radius decreases, and vice versa.

In these circumstances the crank shaft 1 on the one hand and the clutch shaft 2 on the other hand are positively controlled during the active period at the crank pin, and it follows that force $x$ distance, i. e. the work for the corresponding shaft, equals and is independent of the length of the crank radius. As now the length of the oscillator arms 7, 8 is constant the moment of the clutch shaft 2 increases when the crank radius is decreased. In other words, the outgoing moment is inversely proportional to the crank radius. As force x distance is constant it follows that the outgoing velocity is directly proportional to the crank radius.

What has been said above as to the relation of the outgoing moment to the crank radius also applies to the tangential force of the crank pin, i. e. this force is inversely proportional to the crank radius. If now the crank pin is eccentrically mounted relative to the centre of rotation of the crank shaft, then the tangential force will produce a moment about the point of suspension 15 of the eccentric. Also this moment is practically inversely proportional to the crank radius.

Provided that the ingoing moment is constant it thus follows that the outgoing clutch shaft moment is directly proportional to the eccentric moment. If now, as shown, the spring 17 is interposed between the movable eccentric arm 16 and the crank shaft and if the spring is so constructed that for each position of the eccentric, i. e. for each crank pin radius, it provides the correct eccentric moment, then the change of the speed ratio can be made automatic. Thus if for some reason or other for example the road resistance increases, i. e. the clutch shaft moment, then also the eccentric moment increases and the crank radius decreases until a state of balance is reached. The outward visible result is thus that the velocity of the vehicle decreases but that the driving power increases, the ingoing and the outgoing effect still being equal.

If on the other hand the road resistance decreases, i. e. the clutch moment, then the eccentric moment also decreases and the eccentric spring pushes out the eccentric until the crank radius is so great that a state of balance is again reached. This means that the velocity of the vehicle increases.

As already mentioned, the above explanation of the function is based on the assumption that the moment of the crank shaft is constant and that thus the speed ratio depends only on the magnitude of the moment of the clutch shaft, i. e. the change speed mechanism depends on one variable.

A change speed mechanism constructed as above outlined thus functions correctly only on the assumption that the ingoing moment is constant. If this moment varies then the mechanism also changes character in such manner that the ingoing and the outgoing effects no longer are equal. The reason for this lies with the construction of the eccentric spring. This was originally designed to give for a certain crank radius an eccentric moment = $a$ for a crank shaft moment = $b$. If now the crank shaft moment is increased to $b+c$, then the spring must be redesigned so that the eccentric moment at the given crank radius equals $$\frac{b+c}{b} \times a$$

Thus in order that the change speed mechanism should function correctly a new spring will be used for each crank shaft moment. If this be assumed to be theoretically possible, then a wholly automatic change speed mechanism is obtained, responsive to two variables, i. e. the ingoing and the outgoing moment.

In order to ensure the effective and reliable function of a change speed mechanism of the present type also the balancing of the moving masses has to be considered.

The lower ends of the connecting rods as well as the eccentric mass give rise to centrifugal forces which tend to turn the eccentric 16 about its point of suspension 15. This centrifugal moment facilitates the working of the spring but for a given spring and a given crank radius the eccentric moment is no longer constant when the speed of the crank shaft varies. Further the centrifugal moment varies with the length of the crank radius. These disadvantages may be completely avoided by providing the eccentric with a counter weight 18 having such dimensions that the common centre of gravity of the eccentric and the counter weight is located to the centre of rotation of the eccentric arm. Thus the centrifugal forces cannot give rise to any turning moment acting on the eccentric arm 16 at any position of the said arm.

In respect of the crank shaft 1 these centrifugal forces occur with a certain correlated distance and displaced for example 180° relatively to each other. Thus a tilting moment is set up which acts in a plane through the centre line of the crank shaft. At higher motor speeds this may cause vibrations and disturbances.

The tilting moment is independent of the speed ratio and may thus be completely balanced out by means of counter weights 19 suitably mounted on the crank shaft.

Both of the balancing methods just described must be applied to the balancing. The eccentric balance is necessary in order to make the speed ratio independent of the speed of rotation and the crank shaft balance to avoid vibrations. The object of the balancing is to cause the centre of gravity of the whole crank shaft assembly to be at rest under all conditions.

Also in respect of the oscillator the oscillator arm 7 respectively 8 and the upper parts of the connecting rod 5 respectively 6 may, if desired, be balanced out by means of weights 20, so that the common centre of gravity is located to the centre of oscillation. In this way the inertia forces caused by the reciprocating movements of the connecting rods are converted into free unbalanced pairs of forces. As the crank pins are displaced 180° free moments are obtained at the same time having different signs. These moments are located in the same plane and may therefore be displaced parallelly and subtracted. If the oscillator is not balanced essentially free forces are obtained. As it is not possible to displace these parallelly the result is a tilting moment having changing signs. In the present case the free moment arising at the oscillators is probably to be preferred. The centre of gravity of the oscillator now having been displaced to the centre of oscillation the result is that (except a small part of the connecting rod) the centre of gravity of the whole mechanism is at rest under all conditions. This at the same time serves as a check that only free moments can arise.

In Figs. 7–10 the angle A represents the active stroke of the oscillator and the angle B the whole oscillator stroke. Except that it has been made possible to vary the crank radius the function of the device is otherwise principally the same as described with reference to Figs. 1–3.

In a device of the present kind it is of importance that the variation of speed of the outgoing shaft (the clutch shaft) should be as small as possible. It is further important, in order to reduce wear in the clutch as much as possible, that the clutch engagement should be as smooth as possible. This can be obtained by providing separate bearing points for the two lower ends of the connecting rod of the same eccentric. This phase displacement, in this case also called dispersion, ensures a more even clutch change-over.

An embodiment of this kind is shown schematically in Fig. 11. This device is made on the same principles as that shown in Figs. 7-10 having a variable crank radius. For the sake of simplicity the counter weights and the spring between the eccentric arm 16 and the crank shaft 1 have been left out. Some of the other details have also been schematized for the sake of simplicity.

The eccentric arm 16 adjustable about the pin 15 is provided with two separate crank pins 3 and 3a with which the lower ends of the connecting rods 5 and 6 are connected.

According to the range of variation of the speed ratio the said dispersion may be so arranged that the diagram of velocity for the upper ends of the four connecting rods (only two connecting rods being shown) independent of the speed ratio is harmonic in appearance. In explanation the dispersion (the angle of dispersion is denoted by a in Fig. 11) automatically increases with the increasing difference in velocity which otherwise would occur at the clutch change-over at lower speed ratios. Owing to the dispersion the connecting rods mounted on the same eccentric assume slightly different lengths. The resulting variation of velocity may however be made equal to zero for a chosen gear position, but increases on both sides thereof to a maximum of 3–5% for the limit positions of the speed range.

The said dispersion may also be applied to change speed mechanisms having uni-directed rotation according to Figs. 4-6.

Fig. 12 shows schematically an embodiment according to the invention with hydraulic control of the crank radius. In this figure the reference numeral 1, as above, denotes the crank shaft and 2 the clutch shaft, on the latter of which the two oscillators with their clutch mechanisms 7, 13 respectively 8, 13 are mounted. The oscillator arms 7 and 8 are by means of the connecting rods 5 and 6 connected with the common crank pin 3. This latter is, as in the embodiment shown in Figs. 7–10 and 11, carried by the eccentric arm 16 pivoted on the pin 15. The hydraulic controlling mechanism, corresponding to the spring 17 according to Figs. 7–10, is in this case made in the form of a cylinder 21 with a piston 22 moving therein, the piston being connected with the eccentric arm 16 and the cylinder with a bell-crank lever 23 secured to the crank shaft 1. The cylinder is provided with a slot-like outlet opening 24 which according as the piston moves inwardly in the cylinder diminishes more and more, so that the resistance of flow of the liquid discharged from the cylinder increases. The outlet opening 24 may preferably be connected to a separate damping chamber, and further, as will be more fully described with reference to Figs. 13–16, there must be a device for supplying pressure liquid to the cylinder.

Broadly this device functions in the same manner as that according to Figs. 7–10. It is however possible by varying the amount of liquid supplied to the cylinder 21 to vary the eccentric moment, so that also when the crank shaft moment varies the ingoing and outgoing effects may be made to correspond.

Such an embodiment is shown partly schematically in Figs. 13–16. For the sake of simplicity only one pair of connecting rods is shown, as in Figs. 7–12, and further the eccentric, crank shaft and oscillator balances have been left out.

The centre of the crank shaft is denoted by 25 and the crank pin as before by 3. The clutch shaft is denoted by 2, the connecting rods by 5 and 6, the oscillator arms by 7 and 8 and the clutch mechanisms as before by 13. These latter are arranged for counter rotation of the crank shaft and the clutch shaft.

The connecting rods 5 and 6 are mounted on a common eccentric 26 the centre of which is denoted by 27. The eccentric is provided with a socket surrounding the crank pin 3, so that on each side thereof is formed a chamber, i. e. a pressure chamber 28 and a damping chamber 29, which are sealed at the outside by means of plane washers (not shown) mounted at the ends of the eccentric. The eccentric 26 is pivotally mounted on a cylindrical extension 30 formed at one side of the crank pin 3 with the centre at 31 and is on the opposite side provided with a spring loaded sealing piston 32 of the same axial length as the eccentric and tightly fitting against the inner face of the eccentric.

The pressure chamber 28 and the damping chamber 29 are connected by a narrow passage 33, the flow-area of which preferably increases successively in the direction from the pressure chamber to the damping chamber, said area being controlled by the sealing piston 32. When the eccentric 26 swings downwardly about the centre of rotation 31, i. e. from the position in Fig. 15 to the position in Fig. 16, representing a decrease of the crank radius 25–27, the liquid in the pressure chamber 28 is forced through the passage 33 into the damping chamber 29, the resistance to the liquid successively increasing owing to the shape of the passage.

A round-sleeve 34 concentric with the crank shaft centre 25 is made integral with the crank pin 3 and the crank shaft and provided with a passage 35 leading from the periphery and through the crank pin to the pressure chamber 28. The round-sleeve 34 runs with the greater part of its periphery closely against the inner face of a stationary housing 36 provided with a chamber 37 which in the embodiment shown extends over somewhat more than one third of the periphery of the round-sleeve and with which the passage 35 in the round-sleeve during the corresponding part of each rotation of the crank shaft is brought to communicate.

To the chamber 37 is connected the pressure conduit 38 from a pump 39 the suction conduit 40 of which is connected to the liquid container 41 of the change speed mechanism. The pump 39 may either be the oil pump of a vehicle motor or a separate pump. In a branch 42 of the pressure conduit 38 leading directly to the container 41 is provided a control valve 43a respectively 43 which can be operated either manually, for example from the dash board of an automobile, or by means of the accelerator pedal, as more fully described below. The damping chamber 29 is by means of an opening 44 in the eccentric 26 and a passage in the crank shaft, not shown, connected with the liquid container 41. In order to ensure a low liquid consumption a pressure chamber 120 is connected with the pump conduit 38.

In the embodiment shown in Figs. 13–16 the crank shaft is assumed to rotate counter-clockwise and the clutch shaft clockwise, as shown by the arrows.

Figure 13:
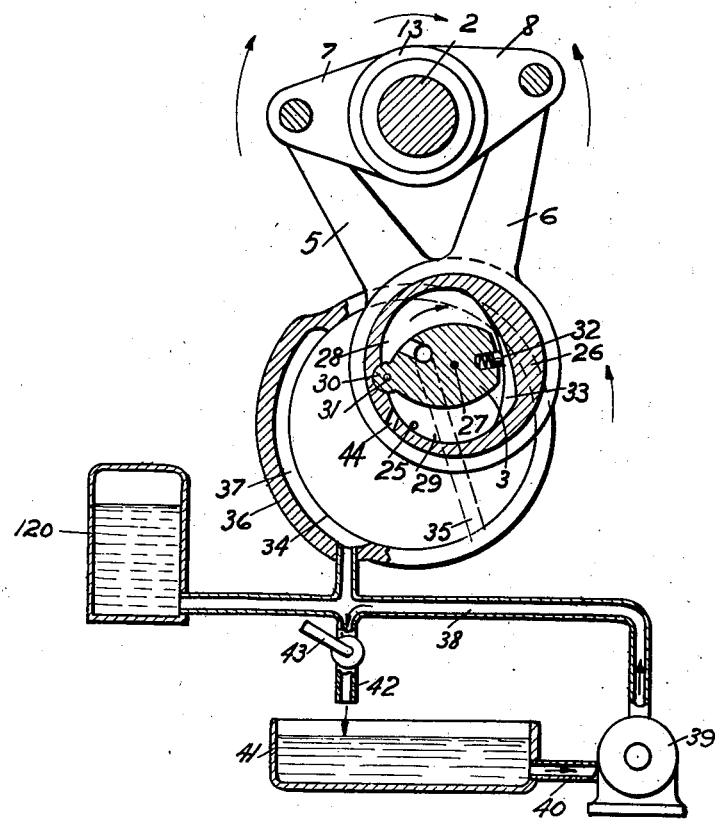
Figure 15:
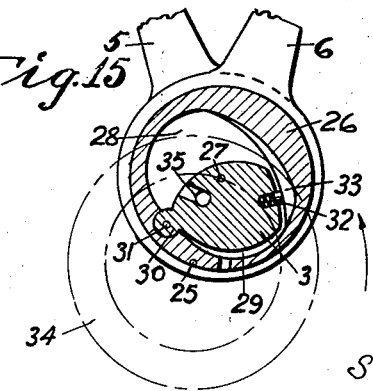

In Fig. 13 the connecting rod 5 is pressure loaded and exercises a relatively high pressure on the liquid enclosed in the pressure chamber 28. In consequence the liquid is forced out through the passage 33 and into the damping chamber 29. The stroke radii of the connecting rods therefore decrease during the active period.

Figure 14:
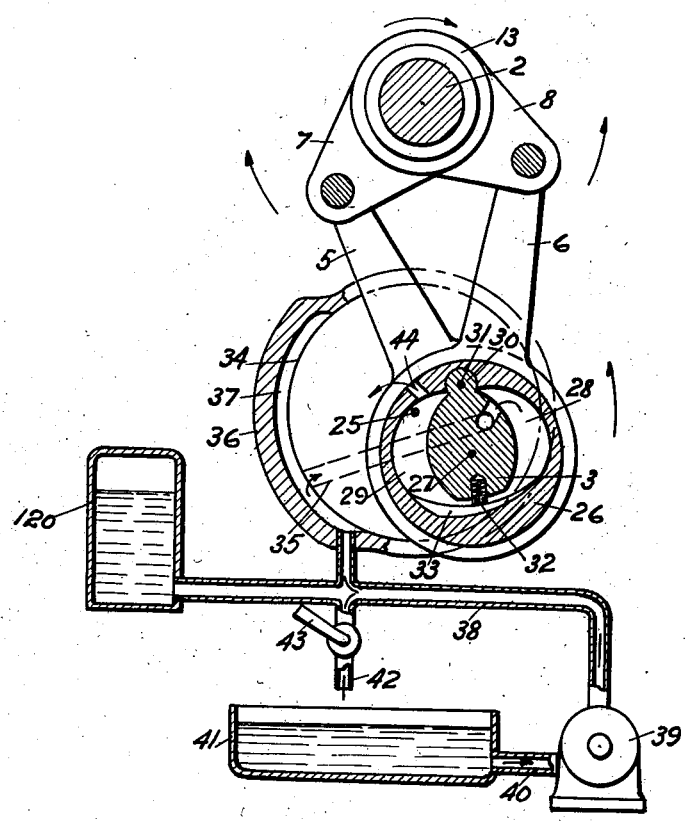

During the liquid replenishing stroke, Fig. 14, the liquid is injected through the passage 35 in the crank shaft into the pressure chamber. As there are no external forces tending to decrease the volume of the pressure chamber (compare the crank pin 4 in Figs. 1, 2, 4 and 6 and the crank pin 3 in Fig. 5) thus the liquid injected into the pressure chamber causes an increase of the stroke of the connecting rods, and consequently wholly or partly compensates the reduction of stroke during the active period.

During the liquid replenishing period the liquid present in the damping chamber is forced out under a comparatively low pressure through the opening 44, which is large compared with the overflow passage 33 and is returned to the container 41.

If now for a certain stroke radius there is a state of balance this means that the liquid forced out during the active stroke is completely replaced by the liquid supplied during the replenishing stroke. If now the moment of the clutch shaft 2 increases it follows that the liquid in the pressure chamber 28 is subjected to a greater pressure and thus also that a larger amount of liquid is forced out through the overflow passage 33. During the active period the eccentric 26 therefore turns in such manner that the section of the overflow passage decreases. During the subsequent replenishing period a constant amount of liquid is still injected but this quantity can no longer compensate the quantity of liquid forced out during the active period, so that the stroke radius does not assume its former value but decreases revolution for revolution until a state of balance is again reached between the liquid forced out and the liquid injected.

If for some reason or other the outgoing clutch shaft moment should decrease, then also the liquid pressure in the pressure chamber decreases and the amount of liquid forced out through the passage 33 becomes momentarily less than the liquid quantity injected during the replenishing period. The result is that the stroke radius increases and thus also the velocity of the outgoing shaft.

The eccentric has now turned so that the section of the overflow passage has increased. At a given position of the eccentric a state of balance is again reached, i. e. the amount of liquid forced out and the amount of liquid injected are equal.

As already mentioned the amount of liquid supplied per unit of time is constant. In order that the mechanism should function as desired it is therefore necessary that for a state of balance for a given position of the eccentric the amount of liquid forced out through the overflow passage per unit of time should be constant and equal to the amount of liquid supplied.

For a given crank shaft moment each stroke radius, i. e. eccentric position, causes a certain calculable pressure on the liquid in the pressure chamber. On basis of these factors, i. e. the liquid pressure for each eccentric position, the section of the overflow passage can be so calculated that the amount of liquid forced out at all speed ratios, i. e. at all eccentric positions, is constant.

Should the ingoing crank shaft moment vary, for instance increase, then for a given eccentric position the pressure on the liquid in the pressure chamber has also been increased and more liquid has been forced out than for the same eccentric position when the crank shaft moment was less. In order to compensate this it is evident that the amount of liquid supplied must be increased, i. e. the pressure must be increased. By means of the pressure controlling valve 43 shown in Figs. 13 and 14 the amount of liquid supplied is manually regulable and may thus be suited to any crank shaft moment.

By means of this pressure controller the speed ratio may thus be varied at will.

The liquid present in the damping chamber 29 has for its object to damp the deflexion of the eccentric during the liquid replenishing period. By suitably diminishing the passage 44 the desired result can be attained. As regards leakage, this can seldom be completely eliminated in devices which for their function depend on a pressure liquid. In the present case such a leakage of liquid at the end faces of the eccentric has to be reckoned with. This does not, however, affect the functioning of the mechanism as long as the leakage percentage for the different speed ratios and for a given ingoing liquid pressure is kept within certain definite limits depending on production tolerances etc. If the sealing gliding faces have been subjected to wear this results in a greater leakage but this can be compensated for simply by increasing the amount of liquid supplied.

It is to be noted, in connection with this liquid controlling, that the mechanism works with low pressure liquid and that the liquid only serves for control. Further that theoretically the speed ratio is not influenced to any extent by a change of viscosity of the controlling liquid.

Figs. 17–28 show a constructional embodiment of a change speed mechanism according to the invention particularly suited for automobiles based on the hydraulic control of the crank radii described with reference to Figs. 13–16 and provided with counter balanced moving masses as described with reference to Figs. 7–10 and with dispersion as described with reference to Fig. 11.

In Fig. 17 the reference numeral 45 denotes the motor shaft which is bolted to a fly-wheel 47 provided as usual with a gear 46 for starting purposes and having mounted in it one end of the clutch shaft 2 by means of a ball bearing 48. To this end of the clutch shaft is secured a plate clutch with its intermediary ring 49 having friction linings 50 and 51 riveted thereto. 53 is a pressure ring which is rotatable with the fly-wheel disc 47 but axially slidable and which is under the load of the springs 52 (only one of these being shown in Fig. 17). At the other side of the pressure ring 53 there is another plate clutch, to the intermediary ring 57 of which are riveted the friction linings 54 and 55. The housing 56 adjacent the lining 55 is rigidly connected to the fly-wheel 47 of the motor. The intermediary ring 57 is rigidly connected to a driving sleeve 60 which by means of the ball bearings 58 and 59 is free to rotate relative to the clutch shaft 2, said sleeve being mounted in a ball bearing 61 so as to be free to rotate in the gear box 62. On the sleeve 60 is slidably mounted an operating sleeve 63 carrying a ball bearing 64, the outer ring of which, when the sleeve 63 is displaced, through the medium of a sealing lid 65 connected thereto actuates a series of levers 66 (only one of these being shown in Fig. 17) pivotally connected to the housing 56, said levers in their turn actuating the pressure ring 53 common to both plate clutches. The displacement of the operating sleeve 63, which in the direction from right to left in Fig. 17 takes place against the action of the clutch springs 52, is effected by means of a yoke arm 68 secured to an operating shaft 67. The operating shaft 67 is, as will be more fully described in the following, connected to a clutch pedal and also to a member for operating a reverse gear.

In the position shown in Fig. 17 of the operating sleeve 63 the plate clutch 49—51 is engaged under the load of the springs 52 and thus the clutch shaft 2 is directly connected to the fly-wheel clutch 47 and the motor shaft 45, whereas when the operating sleeve is displaced to the left the pressure ring 53 is moved to the right and the plate clutch 49—51 is disengaged and then the plate clutch 54, 55, 57 is engaged, so that now the driving sleeve 60 is connected to the fly-wheel disc 47 and the motor shaft 45.

A gear wheel 69 is made integral with the driving sleeve 60 and engages a gear wheel 70 which is secured to the crank shaft 1 mounted in the gear box 62 by means of ball bearings 71 and 72. The crank shaft is, as described above, provided with counter weights 19 and with two crank pins 3 (4) displaced 180° relatively to each other, each carrying an eccentric 26, 26a, constructed and functioning exactly as described with reference to Figs. 13–16 and forming together with the crank pins pressure chambers 28 and damping chambers 29, to the former of which pressure liquid is passed through the passages 35 and 35a provided in the round-sleeve 34 and from the latter of which the liquid is discharged to the container 41 through passages provided in the crank shaft (not shown in the drawings). The eccentrics, which as described above are provided with counter weights 18, are, as shown in Figs. 19 and 20, provided with guide faces 73 and 74, slightly displaced, for the corresponding connecting rods 5, 6 and 9, 10, respectively so that the dispersion described with reference to Fig. 11 is obtained. The eccentrics are sealed at the sides by means of plane rings 75 thrust over the crank shaft.

On each of the eccentrics are mounted the connecting rods 5, 6 and 9, 10, respectively connected to the oscillator arms 7, 8 and 11, 12, respectively which each are connected to separate outer clutch sleeves 13 provided with counter weights 20, as described above.

Each of the one-way clutches comprises in addition to the said outer sleeve separate screw-thread-like wound bands 76, Figs. 21 and 22, the section of which decreases from one end to the other. All four band clutches 76 cooperate with a common inner clutch sleeve 77 and are against rotation connected with this latter sleeve 77 through the medium of open rings 78, Figs. 23 and 24, secured to the sleeve, against one end of which the band clutches rest with their thick ends.

In the embodiment shown each band clutch has twelve turns and the three or four last weak turns rest against the oscillating outer clutch sleeve 13 and form a constant drag. The other turns rest with a certain degree of self-resiliency against the inner clutch sleeve 77 and thereby neutralize any centrifugal forces arising. Between the oscillator sleeve 13 and the band there is thus an intermediary space, to which oil may be supplied during the inactive stroke of the sleeve 13 through passages 79, Figs. 21 and 22, provided at certain points of the band sides. As the mass of the band is small a rapid opening of the play space is possible owing to the said self-resiliency, the oil being wholly or partly forced out at the beginning of the active stroke of the oscillator sleeve. In this way a certain damping is obtained, which serves to improve the clutch change-over. A reliable oil supply is also of the greatest importance with regard to the wear. The internal clutch sleeve 77 is free to revolve on the clutch shaft 2.

As already mentioned there must be an elastic coupling between the one-way clutch mechanism and the driven shaft (the clutch shaft).

In the embodiment shown this coupling comprises torsion rods 80 disposed in axial grooves of the inner clutch sleeve 77, the construction of said rods being shown in detail in Figs. 26 and 27. The rods 80, which are round in section, are at their ends provided with tongues or bends 81 and 82 set at right angles to the rod, of which the tongue 81 is bent in the form of an arc, which when the rod is placed in a groove in the clutch sleeve, is concentric with the clutch sleeve 77, against which it is held by means of a ring 83, Figs. 17 and 28, mounted on the sleeve at the end of the clutch mechanism. The other tongue 82 is flattened out and shaped as a tooth for the purpose of engaging a corresponding recess 84 in a hub member 85 of a gear wheel 86 freely revolvable on the clutch shaft 2. As described more fully below, this gear wheel can be brought into engagement with the clutch shaft.

When there is no load the teeth 84 with their outer ends engage the corresponding faces of the recesses 84 in the hub member 85, as shown in Fig. 25, and the moment arm acting on the torsion rods to turn these about their own axes when power is transmitted, then has its greatest value. When power is transmitted the clutch sleeve turns relatively the hub member 85 and the torsion rods consequently turn about their own axes, thereby rendering the coupling elastic; at the same time the point of engagement of the tooth 82 is displaced inwardly, so that the moment arm decreases and the reaction moment of the rods increases. The turning angle of the rods and consequently their torsional springing is determined by the relative magnitude of the width of the tooth 82 and of the recess 84. After a certain relative turning of the clutch sleeve 77 and the hub member 85 the teeth 82 are brought to bear against both sides of the recesses 84 and the coupling is then rigid. The elastic coupling should, however, be so dimensioned that this limit position is not reached under normal conditions.

The gear wheel 86 driven by the elastic coupling is on its outer side provided with clutch dogs 87 which when running on gear are brought into engagement with corresponding dogs 88 on the inner side of a gear wheel 89 of the reverse gear, which is slidably but not revolvably mounted on the clutch shaft 2. The reverse gear comprises an intermediary gear wheel 90, Fig. 28, in engagement with the gear wheel 86, and further a double-wheel, one tooth ring 91 of which is in engagement with the intermediary wheel 90 and the other tooth ring 92 of which may be brought into engagement with the gear wheel 89 slidably mounted on the shaft 2.

The operating mechanism for the reverse gear is shown more in detail in Fig. 28 and comprises an axially slidable yoke arm 94 which engages a groove in the gear wheel hub 93 and can be operated by a pull rod 95 connected to the operating shaft 67, Fig. 17, for the plate clutches and further by a so called Bowden-wire sleeve 96 brought from the dash board (Fig. 29).

The speed change mechanism described above functions as follows.

In the positions of the different parts shown in Fig. 17 the plate clutch 49—51 is engaged through the action of the springs 52, whereas the plate clutch 54, 55, 57 is disengaged. The clutch shaft 2 is thus connected with the motor shaft 45 and the power transmission is direct. The driving sleeve 60 is at rest and consequently also the crank shaft 1 with the eccentrics 26, 26a and the one-way clutch and the gear wheel 86.

When changing to running on gear the operating shaft 67 is turned counter-clockwise (by depressing the clutch pedal 97, Fig. 29, to its lowest position) when the pressure ring 53 is displaced to the right by the levers 66, so that the clutch 49—51 is disengaged and instead the clutch 54, 55, 57 is engaged. At the same time the driving sleeve 60 with the gear wheel 69 is brought into engagement with the motor shaft 45, and the crank shaft 1 with the crank pins 3, 4 is made to revolve. The clutch dogs 88 on the slidable gear wheel 89 have also by means of the pull rod 95 been brought into engagement with the dogs 87 on the gear wheel 86.

When the crank shaft rotates the eccentrics 26, 26a with their connecting rods 5, 6 respectively 9, 10 through the oscillator arms 7, 8 and 11, 12, respectively, alternately actuate the one-way clutch mechanisms 13 as above described, power being transmitted through the internal clutch sleeve 77 and the elastic coupling 80 to the gear wheel 86 and through the dog clutch 87, 88 and the gear wheel 89 to the shaft 2, which thus is made to revolve.

The speed ratio of the motor shaft 45 to the clutch shaft 2 depends on the load on the clutch shaft, in that the crank radii vary in the way above described with reference to Figs. 13–16, in which the magnitude of said radii depends on the pressure in the pressure chamber 28, said pressure, as mentioned, being variable by regulation of the control valve 43. Principally the function is otherwise the same as described with reference to Figs. 1–3.

When running on gear the intermediary wheel 90 and the double-wheel 91, 92 are running idle. When running on the reverse gear the gear wheel 89 is displaced into engagement with the tooth ring 92 on the double-wheel and the shaft 2 is made to rotate in a direction opposite to the direction of rotation of the clutch sleeve 77 and the gear wheel 86.

In Fig. 29 the reference numeral 98 denotes the motor of an automobile and 62 the casing of a speed change mechanism according to Figs. 17–28, said casing being united with the casing of the motor. The oil pump of the motor is denoted by 39 and the pressure conduit thereof leading to the sleeve mechanism of the eccentrics by 38. The suction conduit leading from the oil pump 41 in the gear box is denoted by 40. In the pressure conduit is disposed the control valve 43, and from this to the suction side of the pump leads the branch conduit 42, all in agreement with the arrangement shown in Figs. 13 and 14. The dash board of the automobile is denoted by 99 and on this is provided an operating button 100, by means of which through the Bowden-wire mechanism 96 the speed change mechanism as described above can be set for reverse gear, and further a second operating button 101, by means of which through a Bowden-wire mechanism 102 a control valve 43a can be manually regulated for controlling the amount of pressure liquid supplied to the pressure chambers of the eccentrics and thereby the speed ratio. The valve 43 is by means of a rod 103 connected to the accelerator pedal 104 in such way that when the amount of gas mixture supplied to the motor increases also the amount of the control liquid supplied increases and thereby the speed ratio is made dependent on the moment of the motor shaft. The clutch pedal connected with the operating rod 95 of the speed change mechanism is denoted by 97 and is shown in the figure in unbroken lines in its outer position, corresponding to direct drive. In the intermediary position both plate clutches are disengaged and the motor as well. In the lowest position the speed change mechanism is engaged, as described above.

In Fig. 30 is shown a device which enables the speed ratio to be made automatically dependent also on the crank shaft moment. The crank shaft is denoted by 1 and the clutch shaft by 2, as above. 69 denotes the gear wheel connected to the driving sleeve 60, Fig. 17, and 70 the gear wheel connected to the crank shaft and engaging the driving wheel 69. The connection between the crank shaft 1 and the gear wheel 70 is in this case in some degree resilient, in that between them are interposed strong compression springs 105 permitting a certain small relative turning between the gear wheel and the shaft. In the crank shaft is provided a supply passage 106 for the pressure liquid from the pump and a discharge passage 107 for carrying the pressure liquid to the slide mechanism 34, 36, Fig. 17. These two passages communicate with a chamber 108 provided in the gear wheel 70, one edge 109 of said chamber more or less throttling the mouth of the discharge passage 107. In this way the crank shaft and the gear wheel form an automatic valve, the action of which depends on the crank shaft moment, so that when the said moment increases the supply of liquid to the pressure chambers of the eccentrics and thereby the pressure in the latter increases and vice versa. This arrangement may of course be used in combination with the manually operated control valve.

In Figs. 31 and 32 is shown an embodiment which in certain respects is similar to that shown in Fig. 30. The connection between the crank shaft 1 and the gear wheel 70 is thus also in this case to a certain degree resilient, in that between them are inserted strong pressure springs 105, permitting a certain small relative turning between the gear wheel and the shaft. With the shaft 1 is in this case rigidly connected a sliding member 110, on which the gear wheel 70 is revolvably mounted and with which the counter weight 19, Fig. 32, is made integral. In this sliding member are provided two diametrically opposite radially narrow passages 111 and 112 communicating with corresponding narrow passages 113 and 114, respectively in the crank shaft, of which the passage 113 leads to the pressure chamber 28 of the eccentric 26 and the passage 114 to the pressure chamber of the eccentric 26a. The passages 111, 113 and 112, 114 communicate with axially directed recesses 115 and 116 respectively at the inner periphery of the gear wheel 70 leading to the container 41, one edge of said recesses, as shown in Fig. 31, responsive to the relative positions of the gear wheel 70 and the slide member 110 more or less covering the mouth of the passages 111 and 112 and thereby controlling the flow of the pressure liquid. The passage systems 111, 113, 115 and 112, 114, 116 form a discharge from the pressure chambers of the eccentrics 26 and 26a and replace the overflow passage 33 shown in Figs. 13, 14 and 17 to the respective damping chambers 29, in which, however, there should be liquid.

The device functions as follows: During the replenishing period of each eccentric 26 and 26a liquid is injected, as above described, through the passages 35 and 35a respectively of the distribution slide 34 into the pressure chamber 28. During the following active period of the eccentric the liquid is forced out through the passage system 111, 113 and 112, 114 which is narrow relatively to the supply passages 35, 35a. The outlet at the recesses or passages 115 and 116 is regulated by the position of the gear wheel 70 relatively to the crank shaft 1 by the slide member 110 in such way that when the outgoing moment increases the exits of the passage are completely or partly opened until so much liquid has been forced out, i. e. the crank radius has been decreased to such an extent, that the elastic moment of the crank shaft has returned to its normal value. When the outgoing moment decreases the moment of the crank shaft also momentarily becomes less, so that the discharge passage is throttled and the stroke radius of the eccentric increases, until the elastic moment of the crank shaft is again normal.

The function of the mechanism above described as also that of the device described with reference to Figs. 17–28 is based on the control of the discharge of the pressure liquid. The same principle may, however, also be applied by controlling the supply of the liquid. This must, however, then be passed first to the gear wheel slide 70, 110 and then to the passages 35, 35a in the distributing sleeve 34, 36. When the outgoing moment increases the supply passage is then throttled and when the outgoing moment decreases it is increased.

In certain cases, when it is desired to reduce the liquid consumption as much as possible and when the time required for a variation of the speed ratio is unimportant, the discharge passage can be completely left out. The incoming liquid then compensates only for leakage losses which may occur. If on the other hand a more rapid variation of the speed ratio is desired a narrow discharge passage which may lead to the damping chamber is provided, as described. Alternatively a passage is provided with a manually or automatically controlled cock or sleeve which rapidly can discharge the liquid present in the pressure chamber.

What I claim as new and desire to secure by Letters Patent of the United States of America is:—

1. A continuously variable change speed mechanism, comprising a driving shaft, a driven shaft, reciprocating driving members between said shafts, one-way clutches for transforming the reciprocating movements of said driving members into a rotary movement of said driven shaft, means on said drive shaft for imparting a reciprocating movement to said driving members, hydraulically active means responsive to the turning moment of said driven shaft for automatically varying the length of stroke of said reciprocating driving members, and means for supplying a fluid to and discharging it from said hydraulically active means.

2. A continuously variable change speed mechanism, comprising a driving shaft, a driven shaft, reciprocating driving members between said shafts, one-way clutches for transforming the reciprocating movements of said driving members into a rotary movement of said driven shaft, means on said driving shaft for imparting a reciprocating movement to said driving members, hydraulically active means responsive to the turning moments of both of said shafts for automatically varying the length of stroke of said reciprocating driving members, and means for supplying a fluid to and discharging it from said hydraulically active means.

3. A continuously variable change speed mechanism, comprising a driving shaft, a driven shaft, reciprocating driving members between said shafts, one-way clutches for transforming the reciprocating movements of said driving members into a rotary movement of said driven shaft, means on said driving shaft for imparting a reciprocating movement to said driving members, hydraulically active means responsive to the turning moment of said driven shaft for automatically varying the length of stroke of said reciprocating driving members, means for supplying a fluid to and discharging it from said hydraulically active means, and manually operable means for controlling said fluid supply.

4. A continuously variable change speed mechanism, comprising a driving shaft, a driven shaft, reciprocating driving members between said shafts, one-way clutches for transforming the reciprocating movements of said driving members into a rotary movement of said driven shaft, means on said driving shaft for imparting a reciprocating movement to said driving members, hydraulically active means responsive to the turning moments of both of said shafts for automatically varying the length of stroke of said reciprocating driving members, means for supplying a fluid to and discharging it from said hydraulically active means, and manually operable means for controlling said fluid supply.

5. A continuously variable change speed mechanism, comprising a driving shaft, a driven shaft, reciprocating driving members between said shafts, one-way clutches for transforming the reciprocating movements of said driving members into a rotary movement of said driven shaft, means on said driving shaft for imparting a reciprocating movement to said driving members, hydraulically active means responsive to the turning of at least said driven shaft for automatically varying the length of stroke of said reciprocating driving members, said latter means comprising a pressure chamber and a damping chamber communicating with each other through a channel, and means for supplying a fluid to said pressure chamber and for discharging it from said damping chamber.

6. A continuously variable change speed mechanism, comprising a driving crank shaft having at least two crank pins, a driven shaft, eccentrics adjustably mounted on the crank pins of said driving crank shafts, one-way clutches in operative connection with said driven shaft and having oscillating arms, connecting rods between said eccentrics and said oscillating arms, each of said adjustable eccentrics having a cavity enclosing the associated crank pin, said pin dividing said cavity into two separate chambers, the one being a pressure chamber and the other a damping chamber, said chambers communicating with each other through a channel, the cross-sectional area of which decreases gradually in the direction towards the said pressure chamber and is controlled by the said crank pin, and means for supplying a fluid to said pressure chamber and for discharging it from said damping chamber.

7. A mechanism as set forth in claim 6, characterized by each eccentric having bearing surfaces for two connecting rods, said bearing surfaces being peripherally displaced relatively to each other with respect to the centre of the crank shaft.

8. A continuously variable change speed mechanism, comprising a driving crank shaft having at least two crank pins, a driven shaft, eccentrics adjustably mounted on the crank pins of said driving crank shaft, one-way clutches in operative connection with said driven shaft and having oscillating arms, a flexible coupling between said clutches and said driven shaft, connecting rods between said eccentrics and said oscillating arms, each of said adjustable eccentrics having a cavity enclosing the associated crank pin, said pin dividing said cavity into two separate chambers, the one being a pressure chamber and the other a damping chamber, said chambers communicating with each other through a channel, the cross-sectional area of which decreases gradually in the direction towards the said pressure chamber and is controlled by the said crank pin, and means for supplying a fluid to said pressure chamber and for discharging it from said damping chamber.

9. A continuously variable change speed mechanism, comprising a driving crank shaft having at least two crank pins, a driven shaft, eccentrics adjustably mounted on the crank pins of said driving crank shafts, one-way clutches in operative connection with said driven shaft and having oscillating arms, connecting rods between said eccentrics and said oscillating arms, each of said adjustable eccentrics having a cavity enclosing the associated crank pin, said pin dividing said cavity into two separate chambers, the one being a pressure chamber and the other a damping chamber, said chambers communicating with each other through a channel, the cross-sectional area of which decreases gradually in the direction towards the said pressure chamber and is controlled by the said crank pin, and means for supplying a fluid to said pressure chamber and for discharging it from said damping chamber, the means for supplying fluid to said pressure chamber comprising a rotary valve body formed on the said crank shaft and having a channel leading to said pressure chamber, a housing surrounding said valve body, and means for supplying fluid to said housing.

10. A continuously variable change speed mechanism particularly adapted for motor vehicles, comprising a motor shaft, a fly-wheel secured to said motor shaft, a driven shaft disposed co-axially with said motor shaft, a releasable coupling between said fly-wheel and said driven shaft, a sleeve on said driven shaft and rotatable relatively thereto, a second releasable coupling between said fly-wheel and said rotatable sleeve, a coupling member carried by said fly-wheel and common to said two releasable couplings, means for operating said common coupling member, a crank shaft in parallel with said driven shaft and having at least two angularly displaced crank pins, motion transmitting means between said rotatable sleeve and said crank shaft, an eccentric adjustably mounted on each of said crank pins, separate one-way clutches in operative connection with said driven shaft by the aid of a flexible coupling and having each an oscillating arm, connecting rods between said eccentrics and said oscillating arms, each of said eccentrics having a cavity enclosing the associated crank pin, said pin dividing said cavity into two separate chambers, the one being a pressure chamber and the other a damping chamber, said chambers communicating with each other through a channel, the cross-sectional area of which decreases gradually in the direction towards the said pressure chamber and is controlled by the said crank pin, and means for supplying a fluid to said pressure chamber and for discharging it from said damping chamber.

11. A continuously variable change speed mechanism, comprising a driving crank shaft having at least two crank pins, a driven shaft, eccentrics adjustably mounted on the crank pins of said driving crank shaft, one-way clutches in operative connection with said driven shaft and having oscillating arms, connecting rods between said eccentrics and said oscillating arms, each of said adjustable eccentrics having a cavity enclosing the associated crank pin, said pin dividing said cavity into two separate chambers, the one being a pressure chamber and the other a damping chamber, said chambers communicating with each other through a channel, the cross-sectional area of which decreases gradually in the direction towards the said pressure chamber and is controlled by the said crank pin, means for supplying a fluid to said pressure chamber and for discharging it from said damping chamber, and a pressure container in communication with said pressure chamber.

12. A change speed mechanism as set forth in claim 10, characterized by the crank shaft, the eccentrics and the oscillating arms being provided with counter weights for obtaining a balancing effect.

13. A change speed mechanism as set forth in claim 10, wherein the motion transmitting means between the rotatable sleeve and the crank shaft comprises two intermeshing gear wheels, characterized by the gear wheel associated with the crank shaft being to some extent flexibly connected to said shaft and forming together therewith an automatically acting valve device for controlling the supply of fluid to the pressure chamber.

14. A change speed mechanism as set forth in claim 10, wherein the motion transmitting means between the rotatable sleeve and the crank shaft comprises two intermeshing gear wheels, characterized by the gear wheel associated with the crank shaft being to some extent flexibly connected to said shaft and forming together therewith an automatically acting valve device for controlling the discharge of fluid from the pressure chamber.

15. A continuously variable change speed mechanism particularly adapted for motor vehicles, comprising a motor shaft, a fly-wheel secured to said motor shaft, a driven shaft disposed co-axially with said motor shaft, a releasable coupling between said fly-wheel and said driven shaft, a sleeve on said driven shaft and rotatable relatively thereto, a second releasable coupling between said fly-wheel and said rotatable sleeve, a coupling member carried by said fly-wheel and common to said two releasable couplings, means for operating said common coupling member, a crank shaft in parallel with said driven shaft and having at least two angularly displaced crank pins, motion transmitting means between said rotatable sleeve and said crank shaft, an eccentric adjustably mounted on each of said crank pins, separate one-way clutches in operative connection with said driven shaft by the aid of a flexible coupling and having each an oscillating arm, connecting rods between said eccentrics and said oscillating arms, each of said eccentrics having a cavity enclosing the associated crank pin, said pin dividing said cavity into two separate chambers, the one being a pressure chamber and the other a damping chamber, said chambers communicating with each other through a channel, the cross-sectional area of which decreases gradually in the direction towards the said pressure chamber and is controlled by the said crank pin, means for supplying a fluid to said pressure chamber and for discharging it from said damping chamber, and manually operable means for controlling said fluid supply.

16. A continuously variable change speed mechanism particularly adapted for motor vehicles, comprising a motor shaft, a fly-wheel secured to said motor shaft, a driven shaft disposed co-axially with said motor shaft, a releasable coupling between said fly-wheel and said driven shaft, a sleeve on said driven shaft and rotatable relatively thereto, a second releasable coupling between said fly-wheel and said rotatable sleeve, a coupling member carried by said fly-wheel and common to said two releasable couplings, means for operating said common coupling member, a crank shaft in parallel with said driven shaft and having at least two angularly displaced crank pins, motion transmitting means between said rotatable sleeve and said crank shaft, an eccentric adjustably mounted on each of said crank pins, separate one-way clutches in operative connection with said driven shaft by the aid of a flexible coupling and having each an oscillating arm, connecting rods between said eccentrics and said oscillating arms, each of said eccentrics having a cavity enclosing the associated crank pin, said pin dividing said cavity into two separate chambers, the one being a pressure chamber and the other a damping chamber, said chambers communicating with each other through a channel, the cross-sectional area of which decreases gradually in the direction towards the said pressure chamber and is controlled by the said crank pin, means for supplying a fluid to said pressure chamber and for discharging it from said damping chamber, and a pressure container in communication with said pressure chamber.

17. A continuously variable change speed mechanism particularly adapted for motor vehicles, comprising a motor shaft, a fly-wheel secured to said motor shaft, a driven shaft disposed co-axially with said motor shaft, a releasable coupling between said fly-wheel and said driven shaft, a sleeve on said driven shaft and rotatable relatively thereto, a second releasable coupling between said fly-wheel and said rotatable sleeve, a coupling member carried by said fly-wheel and common to said two releasable couplings, means for operating said common coupling member, a crank shaft in parallel with said driven shaft and having at least two angularly displaced crank pins, motion transmitting means between said rotatable sleeve and said crank shaft, an eccentric adjustably mounted on each of said crank pins, separate one-way clutches in operative connection with said driven shaft by the aid of a flexible coupling and having each an oscillating arm, connecting rods between said eccentrics and said oscillating arms, each of said eccentrics having a cavity enclosing the associated crank pin, said pin dividing said cavity into two separate chambers, the one being a pressure chamber and the other a damping chamber, said chambers communicating with each other through a channel, the cross-sectional area of which decreases gradually in the direction towards the said pressure chamber and is controlled by the said crank pin, means for supplying a fluid to said pressure chamber and for discharging it from said damping chamber, and manually operable means for controlling said fluid supply, said latter means being in operative connection with the throttle controlling mechanism of the motor vehicle.

SVEN GÖSTA VIBERG.